(12) United States Patent
Barbarek

(10) Patent No.: US 8,059,126 B2
(45) Date of Patent: Nov. 15, 2011

(54) SYSTEM AND METHOD FOR INDICATING SPECIAL CHARACTERS TO BE INTERPRETED LITERALLY

(75) Inventor: Wayne Joseph Barbarek, West Chicago, IL (US)

(73) Assignee: Computer Associates Think, Inc., Islandia, NY (US)

( * ) Notice: Subject to any disclaimer, the term of this patent is extended or adjusted under 35 U.S.C. 154(b) by 767 days.

(21) Appl. No.: 11/693,945

(22) Filed: Mar. 30, 2007

(65) Prior Publication Data
US 2008/0238926 A1   Oct. 2, 2008

(51) Int. Cl.
*G06T 11/60* (2006.01)

(52) U.S. Cl. .................. 345/467; 717/136

(58) Field of Classification Search .......... 345/467
See application file for complete search history.

(56) References Cited

U.S. PATENT DOCUMENTS

| | | | | |
|---|---|---|---|---|
| 6,009,455 A * | 12/1999 | Doyle | .......... | 709/201 |
| 6,338,059 B1 * | 1/2002 | Fields et al. | .......... | 707/4 |
| 6,691,104 B1 * | 2/2004 | Kraft et al. | .......... | 707/3 |
| 6,853,992 B2 * | 2/2005 | Igata | .......... | 707/3 |
| 7,127,458 B1 * | 10/2006 | Mantripragada et al. | .......... | 707/6 |
| 7,133,863 B2 * | 11/2006 | Teng et al. | .......... | 707/3 |
| 7,363,588 B2 * | 4/2008 | Saleh et al. | .......... | 715/746 |
| 7,434,209 B2 * | 10/2008 | Brown et al. | .......... | 717/136 |
| 7,577,641 B2 * | 8/2009 | Koch et al. | .......... | 707/3 |
| 2001/0002471 A1 * | 5/2001 | Ooish | .......... | 707/501 |
| 2001/0007987 A1 * | 7/2001 | Igata | .......... | 707/3 |
| 2002/0042784 A1 * | 4/2002 | Kerven et al. | .......... | 706/12 |
| 2002/0152199 A1 * | 10/2002 | Teng et al. | .......... | 707/3 |
| 2003/0018668 A1 * | 1/2003 | Britton et al. | .......... | 707/513 |
| 2004/0030690 A1 * | 2/2004 | Teng et al. | .......... | 707/3 |
| 2004/0122840 A1 * | 6/2004 | Basichas et al. | .......... | 707/101 |
| 2004/0186722 A1 * | 9/2004 | Garber et al. | .......... | 704/270.1 |
| 2004/0221282 A1 * | 11/2004 | Le Metayer et al. | .......... | 717/159 |
| 2005/0086212 A1 * | 4/2005 | Hughes et al. | .......... | 707/3 |
| 2005/0222977 A1 * | 10/2005 | Zhou et al. | .......... | 707/3 |
| 2006/0053095 A1 * | 3/2006 | Koch et al. | .......... | 707/3 |
| 2007/0162379 A1 * | 7/2007 | Skinner | .......... | 705/37 |
| 2007/0277164 A1 * | 11/2007 | Nandakumaraiah | .......... | 717/143 |
| 2007/0288450 A1 * | 12/2007 | Datta et al. | .......... | 707/5 |
| 2007/0299815 A1 * | 12/2007 | Starbuck et al. | .......... | 707/3 |

OTHER PUBLICATIONS

"EAST" Examiner Automated Search Tool V. 2.4.1 uS Pattents and Trademarks Office 1999 4 pages.*

Two-way adaptation for robust input interpretation in practical multimodal conversation systems Shimei Pan, Siwei Shen, Michelle X. Zhou, Keith Houck Jan. 2005 IUI '05: Proceedings of the 10th international conference on Intelligent user interfaces Publisher: ACM.*

Conceptual Indexing: A Better Way to Organize Knowledge William A. Woods Apr. 1997 Conceptual Indexing: A Better Way to Organize Knowledge Publisher: Sun Microsystems, Inc.*

* cited by examiner

*Primary Examiner* — Javid Amini

(74) *Attorney, Agent, or Firm* — Baker Botts L.L.P.

(57) ABSTRACT

In one embodiment, a method includes receiving a request to perform a task using a special character. The method further includes receiving from a user an indication specifying an interpretation of the special character and storing the indication. The method further includes interpreting the special character using the indication, and performing the task using the interpreted special character.

24 Claims, 2 Drawing Sheets

FIG. 1

```
Search Table !    [Go]              Search in: [Title ▼]

Title           CREATOR    TYPE    DATA BASE
Table 01        JSMITH     T       DBX
Table 3a        BELLA      T       DBX
Tables_users    SJONES     T       DSNDB04
Tablet commands TRANDERS   T       DSNDB04
Table_03        SJONES     T       DSNDB04
Table msg       JHAVRAN    T       DSNDB04
Table !         BSTORY     T       DBX
Table % names   EPERRY     T       DBX
```

FIG. 2

Please select an entry:

☐ Treat special characters, by default, as literal characters.

☐ Treat special characters, by default, as operators.

☐ Prompt me to make a decision regarding the treatment of a special character every time that a special character is encountered.

SYSTEM AND METHOD FOR INDICATING SPECIAL CHARACTERS TO BE INTERPRETED LITERALLY

TECHNICAL FIELD

The present disclosure relates generally to character recognition and more particularly to a system and method for indicating special characters to be interpreted literally.

BACKGROUND

A computer program may utilize user input in the form of written characters such as letters, numbers, or other symbols to provide searching functionality. In certain instances, particular characters may be assigned functional meanings by the computer program in order to assist the program in performing its function. For example, a computer search engine may designate particular characters as operators (e.g., wild cards or space holders) which may be employed by a user in conjunction with partially or fully formed search terms to define the parameters of a search. Oftentimes, the results of such a search are largely defined by the functional meaning of the characters employed.

BRIEF DESCRIPTION OF THE DRAWINGS

FIG. 1 illustrates an example environment for performing a task using special characters;

FIG. 2 illustrates an example environment for indicating special characters to be interpreted literally.

SUMMARY OF THE INVENTION

Figure 3:
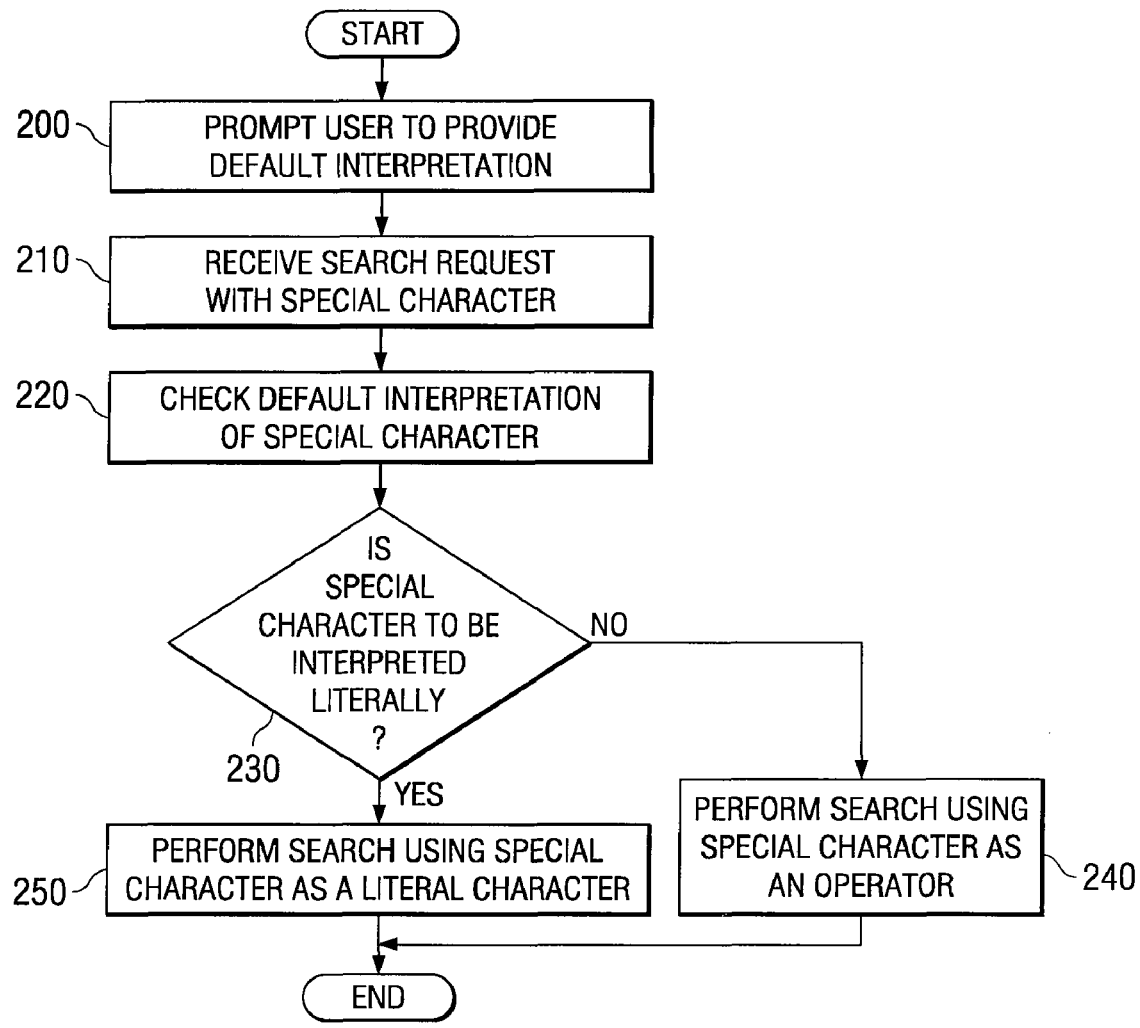
FIG. 3 illustrates an example method for indicating special characters to be interpreted literally.

In one embodiment, a method includes receiving a request to perform a task using a special character. The method further includes receiving from a user an indication specifying an interpretation of the special character and storing the indication. The method further includes interpreting the special character using the indication, and performing the task using the interpreted special character.

Technical advantages of the present invention may alleviate the need for a user to indicate that a special character is subject to "literal interpretation" by enclosing the string or character pattern containing the special character in a special wrapper (e.g., single quotes ('), double quotes ("), slashes (/), or other misc. symbols). Consequently, particular embodiments of the present invention may facilitate data entry on portable devices (e.g., cell-phones or personal digital assistants) where a user of the device may not want to enter any more characters than are absolutely necessary in order to perform a desired task (e.g., a search). Further technical advantages of the present invention may allow a user to indicate that a special character is to be interpreted literally in situations where space is limited (e.g., where the size of a particular search field will not accommodate a special wrapper around a search term).

Other objects, features, and advantages of the present invention will be apparent to persons of ordinary skill in the art in view of the foregoing detailed description of the invention and the accompanying drawings.

DESCRIPTION OF EXAMPLE EMBODIMENTS

FIG. 1 illustrates an example program environment 30 including a search blank 44, a result list 50, and a number of descriptive fields 42. Search blank 44 contains a search term 48 comprised of characters 38 and a particular character 40. Result list 50 displays a number of objects 32 and a particular object 34 that have been located and retrieved by program environment 30. Descriptive fields 42 demarcate particular categories of attributes 36 associated with objects 32.

Program environment 30 may be any component of hardware or software, or any combination of two or more such components capable of interpreting characters. As used herein, the term "program environment 30" may be used to denote both the display environment and the underlying program which is displayed. Program environment 30 may reside in whole or in part on one or more electronic devices such as a web server, a personal computer, a personal digital assistant (PDA), a cell phone, or any other device or combination of such devices capable of storing data. In particular embodiments, program environment may be capable of performing a number of tasks using search term 48 including spell checking documents, searching databases, or providing synonyms. As an example and not by way of limitation, program environment 30 may be a search engine, word processing program, spreadsheet, database, or other program or program component capable of providing search functionality using a search term 48.

To perform a search, program environment 30 may accept a query from a user in the form of a search term 48 and, in response to receiving the query, look for objects 32 with attributes 36 similar or identical to search term 48. As an example and not by way of limitation, program environment 30 may be an embedded search function in a word processing program operable to search for particular terms in one or more documents. In particular embodiments, program environment 30 may be a distinct program capable of performing searches on other distinct programs or databases. In particular embodiments, program environment 30 may be a comprehensive program—capable of both storing data and searching the stored data. In particular embodiments, program environment 30 may be a computer program implemented to create and manage databases such as UNICENTER DB2, though one of skill in the art will assuredly recognize that particular embodiments may be adapted to any computer language or hardware architectural platform.

As an example and not by way of limitation, a user may employ program environment 30 to locate or retrieve one or more particular objects 32 stored in a database. A database may by any combination of hardware, software or other encoded logic capable of providing a structured collection of objects 32. As used herein, the term "object," may be used to describe a record, program, picture, movie, document, word, byte, or other data structure capable of being stored in a database. In particular embodiments, object 34 may be categorized or otherwise described in a database using particular attributes 36 associated with object 34 (sometimes referred to a metadata). As an example and not by way of limitation, attributes 36 of object 34 may include the title of object 34, the name of the creator of object 34, the date of creation of object 34, the most recent modification date of object 34, the database in which object 34 resides, the particular words contained within object 34, or other data/metadata contained in or associated with object 34. The number and type of attributes 36 associated with object 34 may be arbitrarily chosen according to the particular needs of the user or program, or according to some other predefined criteria. In particular embodiments, one or more attributes 36 may be created by the author/creator of object 34, provided by another computer, or generated by program environment 30 itself. As an example and not by way of limitation, a user may entitle object 34

"Table 01" upon creating or otherwise entering object 34 in a database. Thereafter, the phrase "Table 01" may be used by program environment 30 to identify object 34.

Attributes 36 may be composed of one or more characters 38 arranged in a pattern. Characters 38 may be any written symbol, wherein the term "written" encompasses any method of expressing a symbol in a visual format (e.g., typed or hand written). As an example and not by way of limitation, characters 38 may be letters of any language, numbers of any numerical system, or other written symbols. As a further example and not by way of limitation, characters may be nonviewable values of any length of storage (e.g., checksums, keys, authentication codes or XML documents). A [space] may also represent a character. As an example and not by way of limitation, attribute 36 may be composed of a series of characters 38 arranged in lingual words (e.g., "best man speech"), a series of numeric characters 38 (e.g., "384"), a series of symbolic characters 38 (e.g., "@%#"), a case sensitive series of characters 38 (e.g., "aaTcc"), or a combination thereof (e.g., "Table!").

Attributes 36 may be stored by a database in one or more relational categories commonly referred to as fields 42. In particular embodiments, fields 42 describe particular categories of attributes 36. Example fields may include a title field, an author/creator field, a creation date field, a modification date field, or other field describing a particular attribute category. The number and type of fields 42 displayed by program environment 30 may be arbitrarily chosen according to the particular needs of the user or program, or according to some other predefined criteria. Upon creating object 34 or otherwise inserting object 34 into a database, attributes 36 associated with the object may be entered into their respective fields using a number of methods including manual entry by the creator, automatic entry by another program, or automatic generation by the database itself.

In particular embodiments, a user may use one or more attributes 36 associated with object 34 to locate and retrieve object 34 using program environment 30. Program environment 30 may locate and retrieve object 34 based upon search input received through one or more search blanks 44. Search blank 44 may be any hardware or software component or a combination of two or more such components capable of receiving search input (e.g., a text entry box, spreadsheet cell, or a drop down menu). In particular embodiments, search blank 44 may be capable of receiving input from a user, a remote computer program, program environment 30 (e.g., by calling up past inputs), or any other source of input.

In particular embodiments, search blank 44 may be associated with a particular field (e.g., title, date created, author, or other field) using field selection box 46. By selecting a particular field 42 in field selection box 46, a user may indicate the particular field 42 in which program environment should conduct a search. As an example and not by way of limitation, a user may select a title field in field selection box 46 and may enter an appropriate search term 48 (e.g., an object title) into search blank 44. Thereafter, program environment 30 will search for objects 32 having titles identical to search term 48. In particular embodiments, program environment 30 may receive search input from two or more search blanks 44 operating in conjunction, and each being associated with a particular field 42.

In order to search for the object 34 using program environment 30, a user may formulate a search term 48 that represents the title (or other attribute) of object 34 and enter search term 48 into search blank 44. Program environment 30 may parse search term 48 and use the parsed search term to search for object 34. Parsing refers to the process of transforming input (e.g., search term 48) into a data structure suitable for processing by a program. Upon performing the search, program environment 30 may locate and retrieve object 34 and, depending upon the parameters of the search, may return other objects 32 having a title similar to search term 48. Program environment 30 may further be capable of generating a result list 50 containing the results of its search. Upon receiving result list 50, the user may then select object 34 from the result set listed in result list 50.

In particular embodiments, program environment 30 may perform a search by matching the character pattern of search term 48 with the character patterns of one or more attributes 36 associated with objects 38. Search term 48 may comprise one or more characters 38 arranged in a particular character pattern. The character pattern of search term 48 may include information relating to, at least, the order, number, case, spacing, or type of characters contained in search term 48. In particular embodiments, search term 48 may be similar or identical to the title (or other attribute) of the particular object 34 for which the user is searching. Program environment 30 may be capable of analyzing the character pattern of search term 48 and searching for objects 32 having titles (or other attributes) with character patterns similar or identical to search term 48 depending upon the parameters of the search. As an example and not by way of limitation, program environment may receive a request to perform a search for an object 34 having the phrase "Table 01" included in the title. Program environment 30 may parse the phrase "Table 01", perform the requested search, and return a list of objects 32 having the phrase "Table 01" included in the title.

In particular embodiments, program environment 30 may be capable of interpreting character 40 as either a literal character or as an operator. Character 40, when used by program environment 30 to represent either a literal character or an operator, may be referred to as a special character. Character 40, when interpreted literally, represents nothing more than the literal meaning of the character itself (e.g., "&" represents "&"); by contrast, character 40, when interpreted as an operator, may represent a particular operational function or logical meaning (e.g., "&" represents a logical and). Further examples of operators may include wild cards or placeholders (e.g., in particular embodiments, "!" may serve as a wild card and "_" may serve as a placeholder).

Operators may be used by program environment 30 to provide flexible search functionality. As an example and not by way of limitation, a wild card may be inserted at the end of search term 48 as a substitute for any missing or unknown characters, thus expanding the search scope of search term 48. As a further example and not by way of limitation, a user may wish to retrieve object 34 by performing a search. Assuming that the user cannot recall the full title of object 34, the user may enter as much of the title as he can remember followed by a wild card (e.g., "Table!", the "!" representing the wild card) into search blank 44. Program environment 30 may parse the phrase "Table!" and, upon detecting the wild card, may perform a search for all objects 32 having the character pattern "Table" included somewhere in the title. Program environment 30 may return the results of its search to the user in result list 50. Depending upon the certain factors such as the prevalence of the search phrase and the abundance of the objects 32 searched, result list 50 may contain a large number of objects 32 (e.g., hundreds, thousands, or more) through which the user will have to sort in order to locate object 34. Sorting through result list 50 may be a burdensome process for the user, particularly if result list 50 contains numerous objects 32.

In particular embodiments, the user may include a special character as part of search term 48, but may desire program environment 30 to interpret the special character as a literal character rather than as an operator. For instance, in particular embodiments a user may not wish to automatically trigger a search based on an operator, and may rather wish the character pattern to be used as is. As an example and not by way of limitation, the user may wish to retrieve a particular object entitled "Table!" using program environment 30 where the "!" represents an integral literal component of the particular object's title. Assuming that "!" may be interpreted as a wild card (or other operator) by program environment 30, the user may need to instruct program environment 30 to interpret the special character as a literal character rather than an operator; otherwise, program environment 30 may parse the phrase "Table!" and, upon detecting the wild card, may return a list of all objects 32 having the phrase "Table" included in the title. Accordingly, the user would have to sort through result list 50 in order to select "Table!" which, as described above, may be a burdensome process. In particular embodiments, program environment 30 allows a user to specify whether special characters—conventionally used to specify operators—such as place holders or wildcards, when entered into a search blank 44 that is sensitive to pattern-matching sequences, are to be interpreted as an operational component of a character pattern (e.g., as an operator) or as an integral component of a literal name (e.g., as a literal character) of an object or data string within a relational database.

FIG. 2 illustrates an example display 130 used by program 30 to prompt a user to provide an interpretation of a special character. Display 130 may be any component of hardware or software or combination of two or more such components capable of prompting a user to provide an interpretation of a special character or of otherwise receiving an interpretation of a special character from the user. As an example and not by way of limitation, display 130 may appear as a pop up screen, or as a series of dialogues. Upon being prompted by display 130 to provide an interpretation of a special character, the user may provide an indication specifying a particular interpretation of the special character to be used by program environment 30 (e.g., the user may provide a command to interpret the special character as a literal character). Display 130 may accept user input in the form of checkboxes, text blanks, verbal commands, or other form of input. As an example and not by way of limitation, program environment 30 may prompt a user to provide an interpretation of a special character using display 130 by asking, "Do you want to use the special character AS IS, or do you want to treat the special character as selection criteria?" In response, a user may respond to program environment 30 by entering a Y, an N, or an A into a text blank. Y (Yes) may instruct program environment 30 to use the special character, by default, as an operator, but to display a confirmation pop-up screen before performing subsequent searches using the special character. A (As Is) may instruct program environment 30 to interpret the special character, by default as a literal character and never to display the confirmation pop up screen. N (No) may instruct program environment 30 to use the special character, by default, as an operator and never to display a confirmation pop up screen.

In particular embodiments, display 130 may appear as part of a startup menu during initialization of program environment 30, or display 130 may be activated on an impromptu basis by a user. As an example and not by way of limitation, program environment 30 may prompt the user to interpret a special character every time that program environment 30 encounters a special character included in search term 48 (e.g., by requesting the user to provide an on the spot decision on an ad hoc basis). In particular embodiments, program environment 30 may preemptively prompt the user to provide a default interpretation of a special character. The default interpretation may be used automatically by program environment 30 to interpret the special character every time that program environment 30 encounters the special character. In particular embodiments a user may provide different default interpretations for different special characters. As an example and not by way of limitation, the user may instruct program environment 30 to interpret all wild card characters, by default, as literal characters and to interpret all place holders, by default, as operators. In particular embodiments, program environment 30 may remember a user's chosen disposition of a special character and may apply the chosen disposition to subsequent searches, thereby avoiding the need for the user to specify that a special character is to be interpreted literally by wrapping search term 48 in a special wrapper such as quotation marks or other form of opening/closing symbols that may be potentially confused with the title of the object itself.

FIG. 3 illustrates an example method for indicating special characters to be interpreted literally. The method begins at step 200 where program environment 30 prompts a user to provide a default interpretation of a special character. At step 210 program environment 30 receives a request to perform a search for object 34 using a search term that includes a special character. At step 220 program environment checks the user-defined default interpretation of the special character before performing the search. At step 230 program environment interprets the special character according to the user specified interpretation. If the special character is interpreted as an operator, the method continues at step 240 where program environment 30 performs the search using the special character as an operator after which the method ends. If the special character is interpreted as a literal character, the method continues at step 250 where program environment 30 performs the search using the special character as a literal character after which the method ends.

The present disclosure encompasses all changes, substitutions, variations, alterations, and modifications to the example embodiments described herein that a person having ordinary skill in the art would appreciate. Moreover, none of the methodology described herein should be construed as a limitation on the order of events insofar as one of skill in the art would appreciate that such events could be altered without departing from the scope of the invention. Similarly, where appropriate, the appended claims encompass all changes, substitutions, variations, alterations, and modifications to the example embodiments described herein that a person having ordinary skill in the art would comprehend.

What is claimed is:

1. A method, comprising:
    receiving, by at least one electronic device, a request to perform a task using a special character, wherein the special character has a functional meaning and a literal meaning;
    receiving, by the at least one electronic device, an indication from a user, the indication specifying an interpretation of the special character, the interpretation comprising a command identifying whether the special character is to be interpreted using the functional meaning or the literal meaning, the indication received separately from the request to perform the task;
    storing the indication from the user identifying whether the special character is to be interpreted using the functional meaning or the literal meaning;
    using the at least one electronic device to interpret the special character using the indication; and using the at least one electronic device to perform the task using the interpreted special character.

2. The method of claim 1, further comprising prompting the user to provide an indication specifying the interpretation of the special character.

3. The method of claim 2, wherein prompting the user to provide an indication specifying the interpretation of the special character comprises prompting the user to provide an indication specifying the interpretation of the special character using a pop-up screen.

4. The method of claim 1, wherein the indication is selected from the group consisting of:
an indication to interpret the special character by default as an operator;
an indication to interpret the special character by default as a literal character; and
an indication that the special character will be interpreted by the user on an ad hoc basis.

5. The method of claim 1, further comprising automatically interpreting the special character using the indication when performing subsequent tasks.

6. The method of claim 1, wherein the interpretation of the special character comprises an interpretation of the special character as a literal character.

7. The method of claim 1, wherein the request is received from a user.

8. The method of claim 1, wherein the task comprises a search of a database for particular information.

9. The method of claim 1, wherein the special character comprises a place holder or a wildcard.

10. The method of claim 1, wherein:
receiving a request to perform a task using a special character comprises receiving a request from a user to perform a search of a database using a special character;
receiving from a user an indication specifying an interpretation of the special character comprises receiving from a user an indication to interpret the special character by default as a literal character;
interpreting the special character using the indication comprises interpreting the special character as a literal character; and
performing the task using the interpreted special character comprises performing the search of the database using the special character as a literal character.

11. A system, comprising:
an interface operable to receive a request to perform a task using a special Character, wherein the special character has a functional meaning and a literal meaning, the functional meaning invoking a specific operation by the at least one electronic device;
the interface being further operable to receive from a user an indication specifying an interpretation of the special character, the interpretation comprising a command identifying whether the special character is to be interpreted using the functional meaning or the literal meaning, the indication received separately from the request to perform the task;
a memory operable to store the indication;
one or more processors operable to interpret the special character using the indication; and
the processors being further operable to perform the task using the interpreted special character.

12. The system of claim 11, further comprising a display operable to prompt the user to provide an indication specifying the interpretation of the special character.

13. The system of claim 12, wherein the display operable to prompt the user to provide an indication specifying the interpretation of the special character comprises a pop-up screen operable to prompt the user to provide an indication specifying the interpretation of the special character.

14. The system of claim 11, wherein the indication is selected from the group consisting of:
an indication to interpret the special character by default as an operator;
an indication to interpret the special character by default as a literal character; and
an indication that the special character will be interpreted by the user on an ad hoc basis.

15. The system of claim 11, wherein the one or more processors are further operable to automatically interpret the special character using the indication when performing subsequent tasks.

16. The system of claim 11, wherein the interpretation of the special character comprises an interpretation of the special character as an operator.

17. The system of claim 11, wherein the special character comprises a place holder or a wildcard.

18. Logic encoded in non-transitory computer readable media, a computer being operable when reading the media to:
receive a request to perform a task using a special character, wherein the special character has a functional meaning and a literal meaning, the functional meaning invoking a specific operation by the at least one electronic device;
receive from a user an indication specifying an interpretation of the special character, the interpretation comprising a command identifying whether the special character is to be interpreted using the functional meaning or the literal meaning, the indication received separately from the request to perform the task;
store the indication;
interpret the special character using the indication; and
perform the task using the interpreted special character.

19. The logic of claim 18, wherein the task comprises a search of a database for particular information.

20. The logic of claim 18, wherein the special character comprises a place holder or a wildcard.

21. The logic of claim 18, wherein:
the computer is further operable when reading the media to identify the special character in the request and identify the functional meaning assigned to the special character,
the indication from the user instructs the computer to interpret the special character as the literal character not invoking the specific operation rather than as the wildcard character invoking the specific operation, and
when performing the task using the interpreted special character, the computer is further operable to perform the search of the database using the special character as the literal character without invoking the specific operation.

22. The method of claim 1, further comprising identifying the special character in the request and identifying the functional meaning assigned to the special character, and
wherein the indication from the user instructs the at least one computer to interpret the special character as the literal character not invoking the specific operation rather than as the wildcard character invoking the specific operation, and
wherein performing the task using the interpreted special character comprises performing the search of the database using the special character as the literal character without invoking the specific operation.

23. The system of claim 11, wherein the processors are further operable to identify the special character in the request and identify the functional meaning assigned to the special character, and wherein the indication from the user instructs the processors to interpret the special character as the literal character not invoking the specific operation rather than as the wildcard character invoking the specific operation, and wherein performing the task using the interpreted special character comprises performing the search of the database using the special character as the literal character without invoking the specific operation.

24. A computer-implemented method, comprising:

providing a program environment on a computer, the program environment operable to interpret a character as a literal character and as an operator character when performing a search of a database, receiving, by at least one computer, a request from a user to perform a search of a database, the request including a search term comprising a string of characters;

using the at least one computer to recognize a wildcard character within the string of characters, the wildcard character assigned a functional meaning invoking a particular functional operation by the computer and a literal meaning that does not invoke the particular function operated by the computer;

in response to the request, prompting the user to identify whether the wildcard character should be interpreted as a wildcard character invoking the particular functional operation by the computer or as a literal character not invoking the particular functional operation by the computer;

in response to prompting the user, receiving, by the at least one computer, an indication from the user, the indication instructing the at least one computer to interpret the wildcard character as a literal character not invoking the particular functional operation rather than as the wildcard character invoking the particular functional operation, the indication received separately from the request to perform the task;

in response to receiving the indication from the user, using the at least one computer to interpret the wildcard character as the literal character not invoking the particular functional operation; and in response to receiving the indication from the user, using the at least computer to perform the search of the database using the wildcard character as the literal character rather than the operator character, the search performed without invoking the particular functional operation.

\* \* \* \* \*